Figure 1:
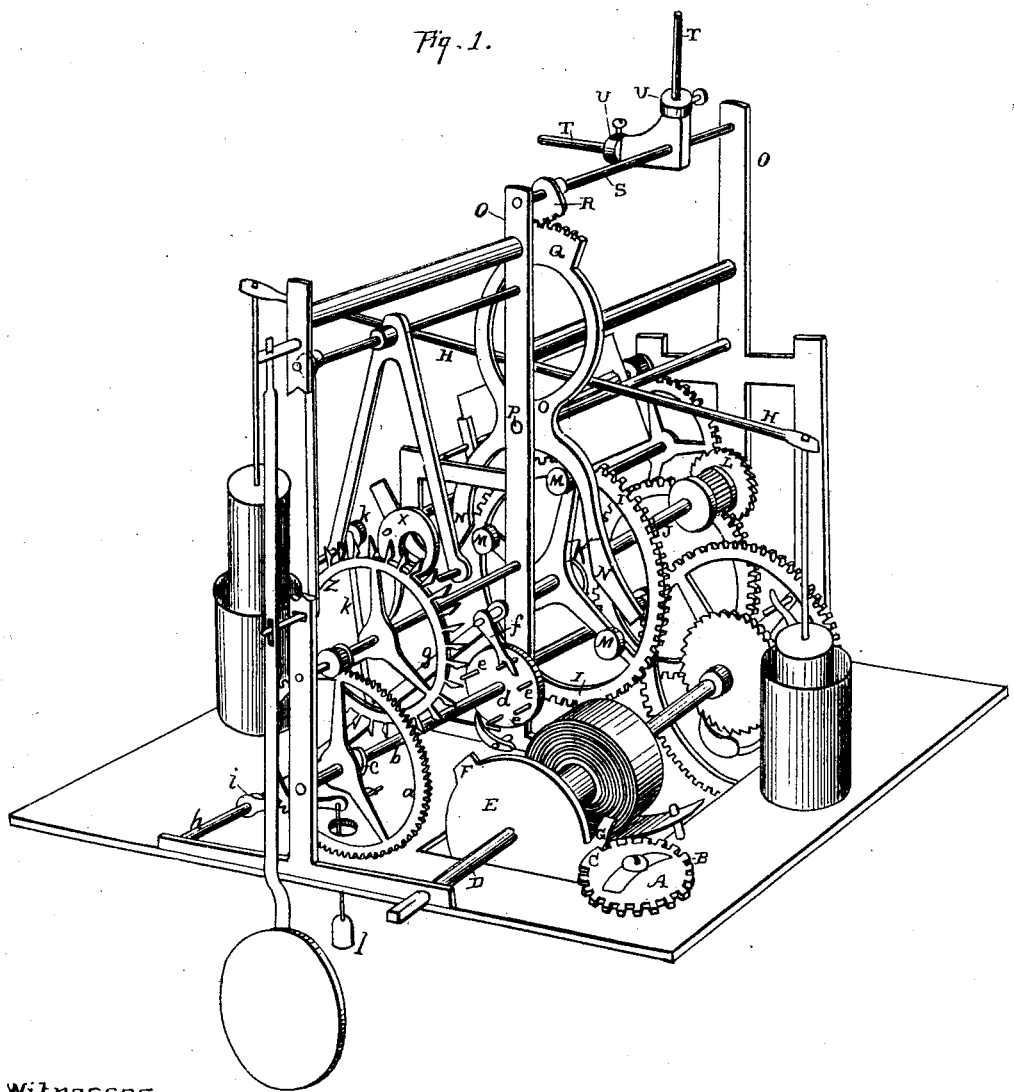

2 Sheets—Sheet 1.

H. J. WENZEL.
Apparatus for Transmitting Chronometric Motion.

No. 228,577.          Patented June 8, 1880.

Witnesses          Inventor

Hermann J. Wenzel

N. PETERS, PHOTO-LITHOGRAPHER, WASHINGTON, D. C.

H. J. WENZEL.
Apparatus for Transmitting Chronometric Motion.
No. 228,577. Patented June 8, 1880.
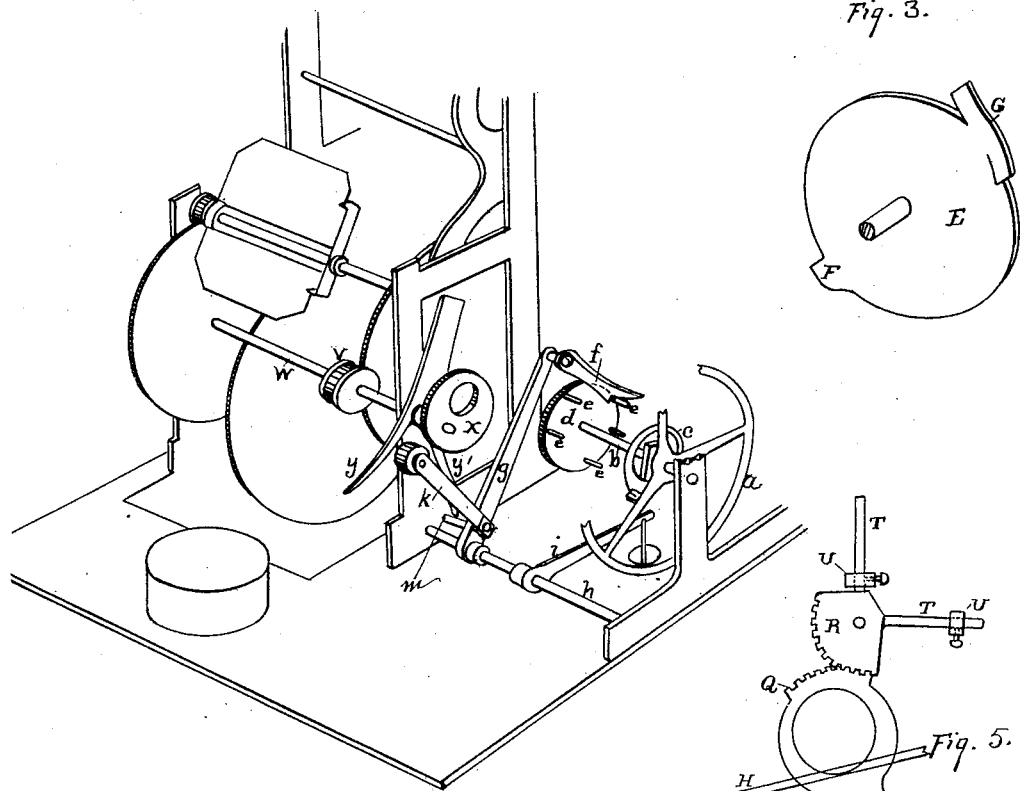
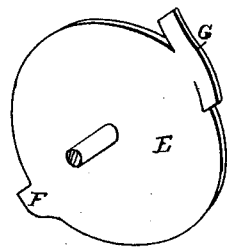
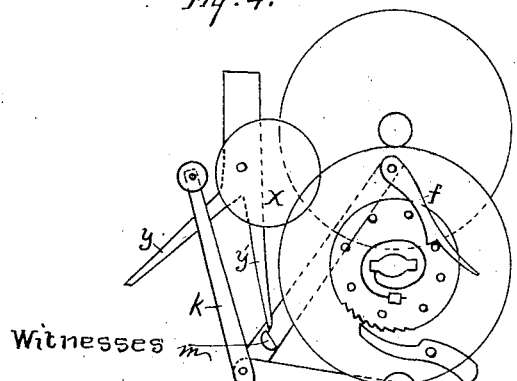
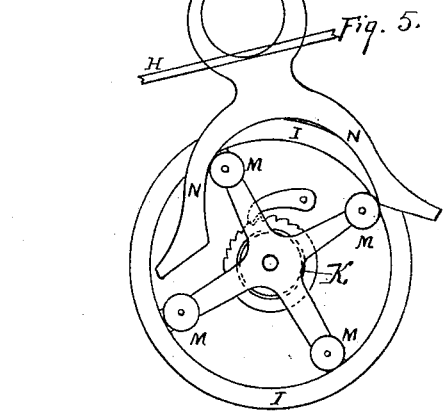
Witnesses
Frank A. Brooks
J. H. Rouse
Inventor
Hermann J. Wenzel

UNITED STATES PATENT OFFICE.

HERMANN J. WENZEL, OF SAN FRANCISCO, CALIFORNIA.

APPARATUS FOR TRANSMITTING CHRONOMETRIC MOTION.

SPECIFICATION forming part of Letters Patent No. 228,577, dated June 8, 1880.

Application filed November 8, 1879.

*To all whom it may concern:*

Be it known that I, HERMANN J. WENZEL, of the city and county of San Francisco, and State of California, have invented an Apparatus for Transmitting Chronometric Motion; and I hereby declare the following to be a full, clear, and exact description thereof.

My invention relates to certain improvements in apparatus for transmitting chronometric motion, and it is especially applicable to an apparatus invented by me and shown in my Patents No. 140,661, of 1873, No. 148,637, of 1874, and No. 196,404, of 1877. In these patents I have shown and described a device whereby several time-pieces are actuated by means of air conveyed through tubes from a central motor or time-piece, and also some details of construction which are described therein.

My present invention relates to improvements in said central motor or time-piece, which will be more fully described by reference to the accompanying drawings, in which—

Figure 1 is a perspective view. Figs. 2, 3, 4, and 5 are detail views.

The first part of my invention relates to an attachment of stop-work to the winding apparatus, whereby overwinding, and consequent breakage of parts, is prevented.

A is a horizontal disk, which is secured to the frame-work by a central pin about which it turns. This disk has its periphery cut into teeth or notches B, which have equidistant spaces between them, except at one side, where a broad tooth or stop, C, extends over one of the spaces. The winding-shaft D, which carries the spring or weight-barrel and the main driving-wheel, has secured to it a disk, E, which revolves with the shaft D, at right angles with the notched disk A and with its edge close to it. A spur or projection, F, upon the edge of this disk E passes between the teeth B as the disk revolves, but will rest upon the broad tooth C and stop the shaft whenever that tooth is brought into line with its rotation.

Upon the edge of the disk E is also secured or formed a projecting strip, G, which is so bent as to stand at any angle with the edge of the disk. When the disk is turned around this screw-flange passes through the space between two of the teeth B at each revolution, and thus turns disk A forward one tooth. The action of winding will thus turn this disk forward one tooth at each revolution of the winding-shaft until the broad tooth C is brought opposite the disk E, when the pin F will strike it and thus arrest the shaft. As the spring or weight unwinds, the spiral flange passing between the teeth at each revolution will reverse the movement of disk A until the clock has run down, when the disk will have made an entire revolution backward and is ready for the operation of winding again.

I have improved the mechanism actuating the oscillating arm H and balancing-arm, as follows: The wheel I turns freely upon the shaft J and is connected with it by a maintaining power-spring, K, and ratchet and pawl L, so that it will be kept in motion while the clock is being wound up.

Upon the arms of the wheel are friction-rollers M, which, when the wheel revolves, will impart an oscillating motion to the arms N N of the frame O, which turns upon the pivot P. The oscillating arm H is secured to this frame and is actuated by it. The pneumatic cylinders are supported from the ends of this arm and are operated by it, as shown.

Upon the top of the frame O is the segment-rack Q, which engages with a pinion or segment, R, upon the shaft S. This shaft has secured to it the two arms T T, which project from it at right angles with each other and carry the regulating-weights U, as shown. This is an improvement upon the devices for balancing and equalizing the action of the cylinders shown in my Patents Nos. 140,661 and 148,637. It enables me to connect any unequal number of distant dials with the two cylinders, as each arm counterbalances one cylinder, and if their action is unequal it may be regulated by setting the weights U farther out or in.

When a large number of clocks are to be operated it will be manifest that a very heavy weight or power will be needed to drive the machinery. It is also well known that the delicacy and accuracy of the escapement are seriously diminished when it is subjected to a very heavy power. I have therefore improved my apparatus by separating the escapement from the other portion of the clock and providing it with a light independent driving power which is actuated and kept in motion by means of the heavier machinery acting upon it at stated intervals.

The wheel I, before described, engages the pinion V upon the shaft W. Upon the shaft W is a cam, X, and one or more arms, $y$ $y'$, as shown, which are driven by it.

The escapement-wheel Z is driven by a wheel, $a$, turning freely upon the shaft $b$, and connected with it by a maintaining-spring, $c$, and the pawl and ratchet wheel $d$, so that its motion will be continued during the intermission of the power. The wheel $d$ has a number of pins, $e$, projecting from one side, as shown, and a click or pawl, $f$, engages with these pins successively, so as to drive the wheel, and by it the escapement-wheel. This pawl or click is actuated by a lever-arm, $g$, to which it is connected. This arm is secured to a shaft, $h$, and, besides this arm, two other arms, $i$ and $k$, also project from it. The arm $i$ has a weight, $l$, suspended from or secured to its end, and this weight, acting through the arm upon the shaft $h$, arm $g$, and pawl $f$, serves to drive the wheel $d$ and escapement. The arm $k$ has a friction-roller upon it, and when the cam X is revolved it strikes this roller and forces the arm $k$ back. This withdraws the pawl $f$ and sets it upon a new pin, $e$, and at the same time raises the lever $i$, with its weight $l$, for a new action.

A stud, $m$, projects from the arm $g$ at a point where it will catch the end of the arm $y$ or $y'$ when the arm $g$ is drawn back by the action of the cam.

The action will then be as follows: The pinion-shaft W is revolved by the action of the main clock-movement through the wheel I. As it rotates it carries the arms $y$ $y'$ and the cam X. The cam will act to lift the arm $g$, carrying the click or pawl $f$, and the latter will be raised far enough to catch the next pin in the wheel $d$. The first of the arms, $y$, will be stopped by the stud $m$, which will hold it until the arm $g$ has moved far enough to allow the arm $y$ to escape from the stud. If two arms, $y$ $y'$, are employed, the second one will catch the stud and be held by it after the first one has passed, for a purpose hereinafter to be described. The weight $l$ upon the arm $i$ causes the shaft $h$ to turn and move the arms $g$ and $k$ forward. The click or pawl $f$ upon the arm $g$, pressing upon the pin $e$, turns the wheel $d$, and through it the escapement-wheel is moved. The arm $k$ moves forward in unison with the arms $i$ and $g$, and at the time when the weight has reached its lowest joint, and the click $f$ has turned the wheel $d$ as far as intended, the roller upon the arm $k$ will have reached a point where the cam X will strike it, when the arm $y$ is released from the stud $m$, and will force the arm $k$ back, thus raising the click to rest upon a new pin and the weighted arm $i$ for a new action.

It will thus be seen that the escapement is actuated by a light power independent of the main clock-movement, but which is periodically wound up or set in motion by the latter. This enables me to employ as powerful machinery as may be necessary to actuate the pneumatic cylinder without injuring the accuracy of the escapement.

One arm, $y$, may be employed to interrupt the movements and make them periodic; but I have found that when the air-cylinders are lifted at once from the cup containing the liquid the action of the air and of capillary attraction between the cylinder and the liquid will cause a considerable commotion as the cylinder leaves the liquid, and this may cause the liquid to splash over into the air-conveying tube. I therefore prefer to employ two arms, $y$ $y'$, the distance between them being such that when the first one escapes from the stud $m$ the movement to the second one will allow the oscillating arm H to raise the cylinder a short distance, so as to nearly or quite clear the liquid. When the second arm escapes the movement of the cylinder is completed without any splash or commotion in the liquid.

By my present construction of the frame O, with its oscillating arms N N, and the friction-rollers upon the wheel I, I produce more frequent oscillation of the bar H and the cylinders, with less movements of the machinery.

The double adjustable compensator T T enables me to connect an unequal number of clocks with the two cylinders and still equalize the pressure upon the apparatus.

Having thus described my invention, what I claim as new, and desire to secure by Letters Patent, is—

1. The oscillating frame O, with its arms N N, said frame carrying the lever H, whereby the pneumatic cylinders are operated, in combination with the wheel I, having the rollers M, by which the arms N is actuated and the frame caused to oscillate, substantially as herein described.

2. The wheel I, turning freely upon the shaft J, and having the rollers M, by which the arms N of the oscillating frame O are actuated, in combination with the maintaining-spring K and the ratchet and pawl L, whereby the oscillation of the mechanism is not interrupted by the action of winding, substantially as herein described.

3. The arms T T, projecting radially from the shaft S, and provided with the adjustable weights U, as shown, in combination with the oscillating frame and arm H and the pneumatic pressure-cylinders, whereby an uneven pressure upon the cylinders may be equalized, substantially as herein described.

4. The arm $i$, with its weight $l$, or equivalent power, and the arm $g$, with its pawl or click $f$, for actuating the escapement independent of the main clock mechanism, in combination with a device whereby this secondary power shall be periodically and automatically wound up or set in operation by the main clock-movement, substantially as herein described.

5. The arm $i$, with its weight $l$, the arm $g$, with its pawl or click $f$, and the arm $k$, with its anti-friction roller, all supported upon the shaft $h$ and moving in unison, in combination with the cam X, which is secured to a shaft driven by the main clock-movement, whereby the arms are drawn back or raised and the escapement kept in motion, substantially as herein described.

6. The arm $y$, supported upon the shaft W of the main clock-movement, in combination with the stud $m$ upon the arm $g$, the weighted lever $i$, and the lever $k$, moving in unison about a common axis, and the cam X upon the shaft W, whereby the periodic action of the oscillating lever H and the setting of the escapement-power are produced, substantially as herein described.

7. In combination with the escapement Z, the levers or arms $i$, $g$, and $k$, and a means for periodically winding or setting the driving-power of the escapement, as shown, the maintaining-spring $c$ and the pawl and ratchet-wheel $d$, whereby the movement of the escapement is rendered continuous during the intermission in the action of the pawl $f$ upon the pins $e$, substantially as herein described.

8. In combination with the pneumatic cylinders operated by the oscillating arm H and clock mechanism, as shown, the arms $y$ $y'$, secured to the shaft W, and the stud $m$ upon the arm $g$, whereby the periodic movements of the cylinders shall be completed by two operations, substantially as and for the purpose herein described.

9. In a clock mechanism having the pneumatic cylinders and oscillating arms for producing periodic movements, as shown, the toothed disk A, with its stop $c$, in combination with the disk E upon the winding-shaft D, said disk having the projection or stop F and the angular plate or switch G upon its edge, whereby overwinding is prevented, as set forth.

In witness whereof I have hereunto set my hand.

HERMANN J. WENZEL.

Witnesses:
   S. H. NOURSE,
   F. A. BROOKS.